United States Patent [19]
Jensen

[11] Patent Number: 4,691,690
[45] Date of Patent: Sep. 8, 1987

[54] FRYING DEVICE

[76] Inventor: Erling Jensen, Nordlyvej 26, DK-8550 Ryomgaard, Denmark

[21] Appl. No.: 907,721

[22] Filed: Sep. 15, 1986

[51] Int. Cl.$^4$ .............................................. A47J 27/00
[52] U.S. Cl. .................................................... 126/390
[58] Field of Search ....................... 126/390, 384, 383; 220/430; 99/375, 372, 425, 446, 347, 422

[56] References Cited

U.S. PATENT DOCUMENTS

| | | | |
|---|---|---|---|
| 2,493,983 | 1/1950 | Lindzy | 126/390 |
| 4,204,607 | 5/1980 | Zani | 126/390 |
| 4,462,388 | 7/1984 | Bohl et al. | 126/390 |

FOREIGN PATENT DOCUMENTS 805064  3/1951  Fed. Rep. of Germany ...... 126/390

Primary Examiner—James C. Young
Attorney, Agent, or Firm—McGlew and Tuttle

[57] ABSTRACT

A frying pan has a bottom surface with an outwardly protruding central, planer and circular masses area which is made for contact with an electrically heated plate. There is also a wing-shaped bottom portion on each side of the contact area. The wing-shaped portions have a periphery which account for 30-80% of the total periphery of the frying pan bottom.

2 Claims, 3 Drawing Figures

FRYING DEVICE

The present invention relates to a frying device of the kind described in the introductory clause of claim 1.

Such devices are normally heated by an electric current supplied hot-plate having the same diameter as the contact area of the device, and the hot-plate will be damaged if the diameter of the contact area is smaller than the diameter of the hot-plate.

U.S. Pat. No. 2,493,983 discloses a frying pan of this kind wherein a single, uniformly wide, ring shaped bottom portion of about 35% of the total bottom area surrounds the contact area or about 65% of the total bottom area.

By the measures stated in the characterizing clause of claim 1 is achieved that during use of the device, e.g. for frying, the temperature difference between the contact area and the wing shaped bottom portion will be less than the corresponding temperature difference between the ring shaped portion and the contact area on the frying pan according to said U.S. patent. The device according to the present invention will thus have a more uniform frying temperature over the total inner bottom area of the device.

Figure 1:
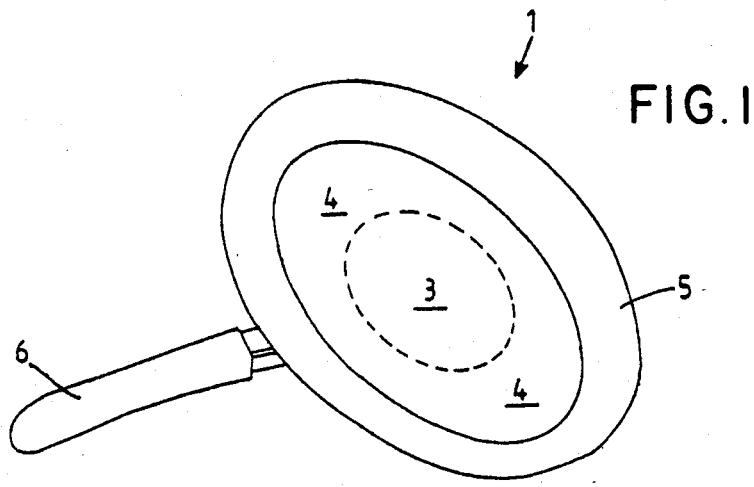

The invention will now be described in more detail in connection with some embodiments and with reference to the drawing in which FIG. 1 shows a perspective view of a device having two wing shaped bottom portions, FIG. 2 a section of the device in FIG. 1 taken along a middle line plane, and FIG. 3 the device of FIG. 1 and 2 seen from below.

Figure 2:
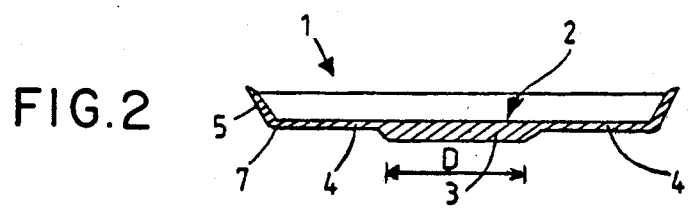
Figure 3:
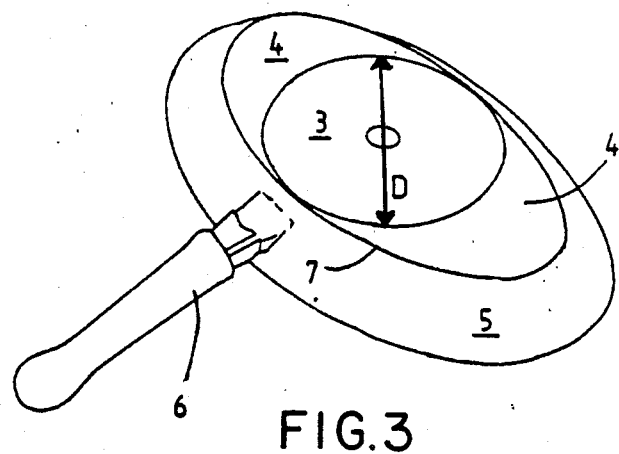

FIGS. 1-3 show a frying device in the shape of a frying pan 1 having a massive bottom 2 and a plane and circular hot-plate contact area 3 protruding therefrom. The bottom 2 exceeding the area 3 is here formed by two wing shaped bottom portions 4, each of which is directly connected to the area 3 via a periphery length thereof of 30-80%, here about 40-50% of its total periphery. The area 3 and the bottom portions 4 are connected to an outwardly inclining, annular and elliptic side wall 5 which as shown is provided with a control handle 6. The side wall 5 extends via a rounded transition zone 7 to the area 3 and the bottom portions 4.

The material thickness of the area 3 is 20-50%, preferably 30-40% more than the smallest material thickness of the bottom portion 4.

The device is made from aluminium, cast iron or steel. Suitable material thicknesses by aluminium is 5-8 mm for the area 3 and 3-5 mm for the bottom portion 4 and the sidewall 5. Devices of cast iron may have the same or larger material thicknesses. The interior surface of the device may be coated, e.g. by polytetrafluoroethylene or a silicone compound and the lower surface of the contact area 3 may be furnished with a layer of copper.

In excess of said better heat distribution over the bottom 2 also a shorter heating up time for the device and a consequent saving in heat consumption is achieved.

I claim:

1. A frying device for use with an electrically heated hot circular heating plate, comprising a pan having a bottom, said bottom having a central planar circular massive hot heating plate contact area protruding from its underneath exterior and providing a high heat transfer central contact area, said bottom also having a wing-shaped bottom portion on each side of said contact area with a portion bordering a side of said hot plate contact area having a periphery of a length which is from 30 to 80% of its total periphery and providing a good heat transfer from said hot heating plate contact area, said bottom having a transition zone between said hot heating plate contact area and said wing-shaped bottom portion which has a thickness greater than the smaller thickness of said wing-shaped bottom portions, said hot heating plate contact area having a thickness which is from 20 to 50% greater than the smallest thickness of said wing-shaped bottom portion.

2. A frying device according to claim 1, wherein the thickness of said hot heating plate contact area is from 30 to 40% more than the smallest material thickness of said wing-shaped bottom portion.

* * * * *